United States Patent
Pekowski

(10) Patent No.: US 6,769,126 B1
(45) Date of Patent: *Jul. 27, 2004

(54) APPARATUS AND METHOD FOR DEMAND LOAD ANALYSIS

(75) Inventor: Raymond Paul Pekowski, Austin, TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 907 days.

(21) Appl. No.: 08/763,135

(22) Filed: Dec. 10, 1996

(51) Int. Cl.⁷ ................................................ G06F 9/00
(52) U.S. Cl. ...................... 719/331; 717/163; 717/128; 717/127
(58) Field of Search .................................. 395/685, 710; 709/305, 300, 331, 332; 714/745; 719/331, 332; 717/124, 127–128, 131–133, 151–167

(56) References Cited

U.S. PATENT DOCUMENTS

| 5,247,678 A | 9/1993 | Littleton ...................... 709/331 |
| 5,247,681 A | 9/1993 | Janis et al. ................... 709/331 |
| 5,339,430 A | 8/1994 | Lundin et al. ............... 709/332 |
| 5,369,766 A | 11/1994 | Nakano et al. .............. 709/332 |
| 5,369,770 A | 11/1994 | Thomason et al. .......... 710/260 |
| 5,375,241 A | 12/1994 | Walsh ......................... 709/331 |
| 5,450,586 A | 9/1995 | Kazura et al. ............... 717/124 |
| 5,475,840 A | 12/1995 | Nelson et al. ............... 709/331 |
| 5,517,629 A * | 5/1996 | Boland ......................... 714/38 |
| 5,673,315 A * | 9/1997 | Wolf ............................ 705/59 |
| 5,812,848 A * | 9/1998 | Cohen .......................... 709/331 |
| 5,835,749 A * | 11/1998 | Cobb ........................... 709/331 |
| 5,878,384 A * | 3/1999 | Johnson et al. ............. 702/187 |

OTHER PUBLICATIONS

"IBM OS/2 16/32-bit Object Module Format (OMF) and Linear eXecutable Module Format (LX), Revision 9," *IBM Corporation*, Nov. 1995.

"Windows 95 System Programming Secrets," *IDG Books Worldwide, Inc.*, pp. 685–705, 1995.

* cited by examiner

*Primary Examiner*—Lewis A. Bullock, Jr.
(74) *Attorney, Agent, or Firm*—Duke W. Yee; Jeffrey S. LaBaw; Charles D. Stepps, Jr.

(57) ABSTRACT

For a given set of programs and their related DLLs the following tool and method finds the minimum set of DLLs for which to apply demand loading and quantifies a lower bound on the expected performance improvement that comes from applying demand loading to the identified set of DLLs. Additionally, the tool and method identifies the set of DLLs in which demand loading cannot be applied because of data exports, but which might benefit from demand loading.

17 Claims, 13 Drawing Sheets

APPARATUS AND METHOD FOR DEMAND LOAD ANALYSIS

CROSS-REFERENCE TO RELATED APPLICATIONS

APPARATUS AND METHOD FOR TRACING ENTRIES TO OR EXITS FROM A DYNAMIC LINK LIBRARY Ser. No. 08/763,136, U.S. Pat. No. 5,946,486, incorporated herein by reference and APPARATUS AND METHOD FOR DEMAND LOADING A DYNAMIC LINK LIBRARY, Ser. No. 08/742,103, U.S. Pat. No. 6,003,095, incorporated herein by reference.

FIELD OF THE INVENTION

The present invention relates in general to information handling systems and more particularly to an apparatus and method for demand load analysis. Specifically, the present invention relates to an apparatus and method for selecting from a computer application program one or more dynamic link libraries (DLLs) to be demand loaded and for determining the benefit gained from demand loading a DLL or set of DLLs.

BACKGROUND OF THE INVENTION

A computer application program usually includes a number of separate routines. Typically, the routines include a main program and several subsidiary routines referred to as objects, modules, or resources. Execution of the application program begins with the main program with calls being made to the subsidiary routines. To operate as a complete program, prior to execution these routines are linked together using a linker such as 386 link. The linker copies each of the routines into an executable file for the application program. The linker also provides each of the routines with information identifying the locations of other routines so that the routines can access each other. The executable file can then be loaded into the memory of a computer such that the application program can be executed by the computer according to the instructions in the routines.

A dynamic link library (DLL) is an executable module or routine containing services that application programs can call to perform useful tasks, e.g., directory searches, login commands, searching functions, character string manipulations, etc. DLLs exist primarily to provide services to application programs. These libraries play an important role in operating systems such as Windows and OS/2, which use them to make their services and resources available to application programs.

DLLs are similar to run-time libraries. The main difference between DLLs and run-time libraries is that DLLs are linked with the application program at run time, that is, when the computer is executing the application program, not when the application program files are linked with the linker. Linking a library with an application program at run time is referred to as dynamic linking; linking a library with an application program by using the linker is referred to as static linking. The discussion below focuses on the OS/2 operating system (OS/2 is a trademark of International Business Machines Corporation), but those of ordinary skill in the art will understand that the following discussion applies equally to other operating systems, such as Windows, which utilize DLLs.

To access a DLL at run time, the application program must be able to obtain information indicating where to find the DLL. One method provided by operating systems utilizing DLLs is to use an import library, or reference library, which contains information regarding where to locate the DLL at run time. During linking, the linker uses statically linked reference libraries to resolve references to external services. As noted above, when an application program desires a service from a static link library, the linker copies the code for that service into the application program's executable file. When the application program desires a service run from a DLL, however, the linker does not copy any code from the DLL. Instead, the linker searches all defined import or reference libraries to find one that contains the necessary information regarding location of the DLL. The linker copies the necessary information from the reference or import library to create a dynamic link between the executing application program and the DLL.

When a process loads under the OS/2 operating system, all DLLs that the process references, either directly or indirectly, are also loaded. DLLs referencing other DLLs form a reference tree, the entire set of which gets loaded before the first instruction of the main program is executed. A typical DLL is only partially loaded. The remainder of the DLL is loaded on its first reference. The minimum DLL load requires some initialization in the operating system and the execution of the DLL's initialization routine. Any code or data referenced by the initialization routine, including the initialization routine itself, is loaded. For some DLLs, the dynamic link load time is quite expensive in terms of time, particularly if the DLL is very large or the DLL's initialization routine is very long.

The problem with load time initialization as described above is that frequently a process does not call the DLLs that it references. Therefore, the DLLs which are referenced but not called are unnecessarily loaded. When the load time of the unnecessary DLLs is a large percentage of the total execution time, the performance of the process degrades significantly.

There is a method utilized in the OS/2 operating system to prevent the unnecessary loading of DLLs. The method is called demand loading and is implemented using a well-known documented set of OS/2 operating system APIs (Application Program Interfaces). Demand loading is the process of delaying the load of a DLL until it is actually called. If a DLL is demand loaded but never demanded or called, it is effectively not loaded, and the cost of loading it is saved.

It will be appreciated that demand loading is utilized in other operating systems and creates problems similar to those encountered with the OS/2's demand loading technique.

The problem with the OS/2's demand loading technique is that it is difficult to use, particularly if a program has initially been written without it. It requires the programmer to replace a call to a target dynamic link with a load check, a couple of OS/2 demand loading APIs, and error recovery should the OS/2 APIs fail.

In U.S. patent application Ser. No. 08/742,103, U.S. Pat. No. 6,003,095, of common assignee herewith, an apparatus and method for automatically generating "demand loading code" necessary to implement an operating system's demand loading APIs is disclosed. The resulting code is packaged into a library which replaces a statically linked DLL reference library. In this manner, the called DLL is not changed in any way, but a tool is run against it to automatically generate a demand loading library for demand loading the DLL.

Performance analysis of a large software system with many DLLs can be very difficult. Many kinds of information are needed for the OS/2 operating system (OS/2 is a trademark of International Business Machines Corporation). A dekko hook/trace tool provides some, but not all, of the needed information. The dekko hook/trace tool provides timing information on both operating system events as well as user-written events. The dekko hook/trace tool searches the syntax of a C source file for the entry and exits of routines and automatically inserts dekko hooks. One of the problems with the dekko hook/trace tool, and the suite of utilities that thus far have been written for it, is a mechanism to easily and automatically apply dekko hooks to new code has not been provided.

Other non-dekko based performance tools have tried to solve the automatic and ease of use hooking problem, but each having been lacking in some respect. One particular problem is that prior art tools require some level of access to the source files used to build the executable of interest. Another problem is the processing overhead prior art tools introduce in the software being analyzed. For example, a dekko hook/trace tool requires access to source code so it can be temporarily modified and recompiled. The IBMCPP Performance Analysis Tool requires a recompile of the source code with a compiler switch indicating to enable tracing. IBMCPP Performance Analysis Tool is a tool which automatically hooks the entry and exits of routines and uses its own private trace log. MTrace is an instruction level trace tool which counts the number of instructions executed and accounts them to routine names. The MTrace tool does not require access to the source code but does require a symbol table generated when the executable of interest was built and thus cannot be applied to off-the-shelf products. It is also difficult to set up and generates too much detail for some long-running scenarios. It does not provide real timing information, just instruction counts, and introduces a large amount of overhead.

In U.S. patent application Ser. No. 08/763,136, U.S. Pat. No. 5,946,486, of common assignee herewith, a source code independent tool for hooking or tracing entry or exit points of DLLs is described. The tool only uses information that can be pulled from the DLL file itself. No source code access is required, so the tool is very convenient to use. In fact, having the ability to hook a DLL's entry and exit points is very useful in helping to answer demand load questions, such as where, or to which set of DLLs to apply demand loading and how much benefit comes from demand loading.

What is needed is an apparatus and method for answering these two questions and, in general, for performing demand load analysis.

SUMMARY OF THE INVENTION

Accordingly, the present invention provides a method and apparatus for demand load analysis. The present invention is implemented in part by customizing the hooking tool described in APPARATUS AND METHOD FOR TRACING ENTRIES TO OR EXITS FROM A DYNAMIC LINK LIBRARY, Ser. No. 08/763,136, U.S. Pat. No. 5,946,486. However, it will be appreciated that the present invention may be implemented using other tools, apparatuses and methods.

The present invention provides a method, implemented in an information handling system, for selecting one or more dynamic link libraries (DLLs), utilized in an application program, to be demand loaded. The method comprises the steps of identifying a DLL reference by the application program; tracing outputs from the DLL; examining the traced output of the DLL to determine whether the DLL was executed; and selecting the DLL to be demand loaded if the DLL was not executed.

The present invention also provides a computer program product implemented in a computer system for implementing the above-described method.

The present invention also provides a computer program product comprising a program of instructions including a DLL, a shadow DLL, and wherein the shadow DLL includes code for tracing events occurring upon entries to or exits from the DLL and code for demand loading the DLL.

The present invention also provides an information handling system including one or more processors, memory and a program of instructions including a DLL, a shadow DLL, and wherein the shadow DLL includes code for tracing events occurring upon entries to or exits from the DLL and code for demand loading the DLL.

The present invention also provides a method and a computer program product, implemented in an information handling system, for determining a minimum time saved in the execution of an application program having one or more dynamic linked libraries (DLLs) by demand loading the DLL. The method includes the steps of generating a shadow DLL for tracing entries to or exits from a DLL and for demand loading the DLL; loading the shadow DLL upon reference by the application program; and measuring the time to execute the application program to determine a minimum time saved by demand loading the DLL.

The main advantage of the present invention is providing DLL demand load analysis without modification to the DLL or application program.

Another advantage of the present invention is providing an apparatus and method for providing a demand load analysis tool which automatically generates a shadow DLL for tracing events occurring upon entry to or exit from a DLL and for demand loading the DLL without modifying any code of the DLL and without adding substantial processing overhead to the DLL.

BRIEF DESCRIPTION OF THE DRAWINGS

FIGS. 4A–4I illustrate a detailed flow chart of the present invention.

DETAILED DESCRIPTION OF A PREFERRED EMBODIMENT OF THE INVENTION

In the following description, for purposes of explanation, specific program procedures, APIs, and configurations are set forth to provide a thorough understanding of the present invention. The preferred embodiment described herein is implemented with an OS/2 operating system created by IBM (OS/2 and IBM are registered trademarks of International Business Machines Corporation). However, it will be apparent to one skilled in the art that the present invention may be practiced without the specific details and be implemented in various computer systems utilizing various operating systems and in various configurations or makes or models of tightly coupled processors or in various configurations of loosely coupled multiprocessor systems. The procedural descriptions and representations which follow are the means used by those skilled in the art to convey the substance of their work to others skilled in the art.

Figure 1:
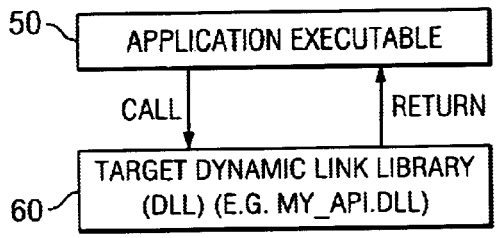
FIG. 1 is a block diagram illustrating an application program executable which utilizes a dynamic link library wherein no demand load analysis is performed according to the present invention.

FIG. 1 illustrates an application executable 50 containing a call to a target DLL 60. After target DLL 60 completes its service, it then returns to application executable 50.

Figure 2:
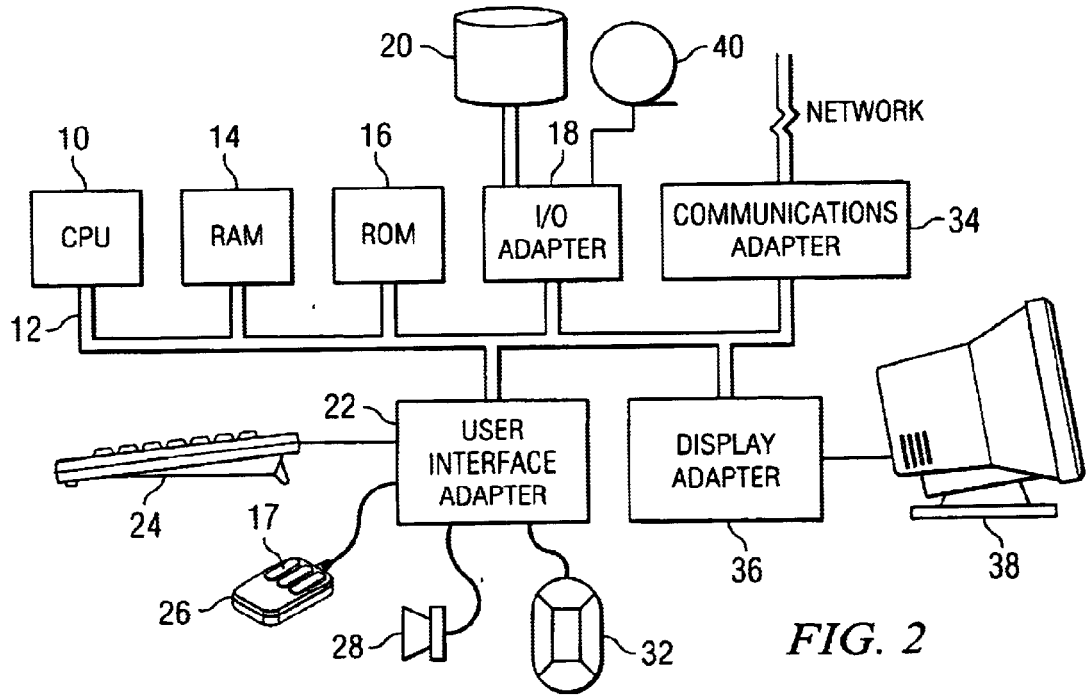
FIG. 2 is an information handling system embodying the present invention.

The detailed descriptions which follow are presented in terms of program procedures executed on or in an information handling system generically referred to as a computer or a network of computers. A representative hardware environment for practicing the present invention is depicted in FIG. 2, which illustrates a typical hardware configuration of a computer or information handling system in accordance with the subject invention, having at least one central processing unit (CPU) 10. CPU 10 is interconnected via system bus 12 to random access memory (RAM) 14, read only memory (ROM) 16, and input/output (I/O) adapter 18 for connecting peripheral devices such as disc units 20 and tape drives 40 to bus 12, user interface adapter 22 for connecting keyboard 24, mouse 26 having button 17, speaker 28, microphone 32, and/or other user interfaced devices such as a touch screen device (not shown) to bus 12, communication adapter 34 for connecting the information handling system to a data processing network, and display adapter 36 for connecting bus 12 to display device 38.

Figure 3:
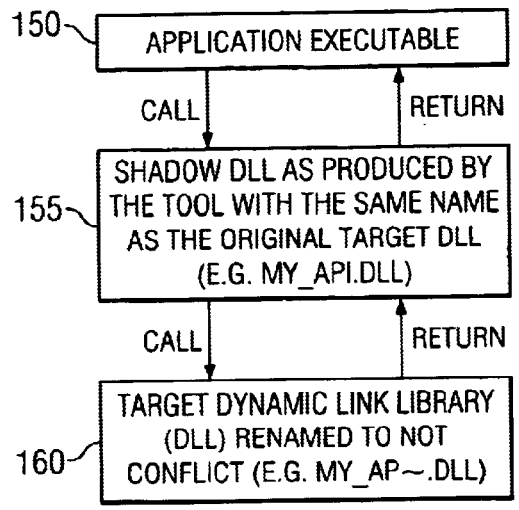
FIG. 3 is a block diagram illustrating an application program executable which utilizes a dynamic link library and tracing according to the present invention.

Referring now to FIG. 3, reference numerals which are like or similar to the reference numerals of FIG. 1 are intended to indicate like or similar steps. FIG. 3 illustrates a method and apparatus which is implemented in an information handling system having an operating system for performing DLL demand load analysis; specifically, but not limited to, selecting from a computer application program one or more DLLs to be demand loaded and for determining the benefit gained from demand loading a particular DLL or a set of DLLs. According to the present invention, a shadow DLL is generated in step 155. The shadow DLL is generated by an apparatus or method according to the present invention and has the same name as the original target DLL from step 160. The target DLL in step 160 is renamed so that the target DLL and the DLL do not conflict. In this manner, the shadow DLL acts as an interceptor of all calls being made to the target DLL, and thus each call to the target DLL and return from the target DLL passes through the shadow DLL. The shadow DLL contains code for demand loading the target DLL and for tracing events occurring upon entries to or exits from the target DLL. The shadow DLL is generated or built from information that is taken from the target DLL's linear EXE header. The format of the linear EXE header is documented in IBM OS/2 16/32-bit module format (OMF) and linear executable module (LX). Thus, the first step in generating or building the shadow DLL is finding all entry points into the dynamic link library as listed in the EXE header. For each DLL entry point listed in the EXE header, the following information is extracted: name of the DLL, the ordinal of the DLL, and the type of the DLL, that is, whether it is 16-bit or 32-bit. The name, ordinal, and type are used to automatically generate assembly language routines which act as the resolution point for calls to the DLL by a calling executable from an application program and assembly language routines for implementing the demand loading function. The details of building or generating a shadow DLL will be explained further in connection with the description of FIGS. 4A–4I. The assembly language routines are assembled into object code and then packaged together along with some initialization routines to produce a shadow DLL to perform program execution code tracing and demand loading.

Figure 4A:
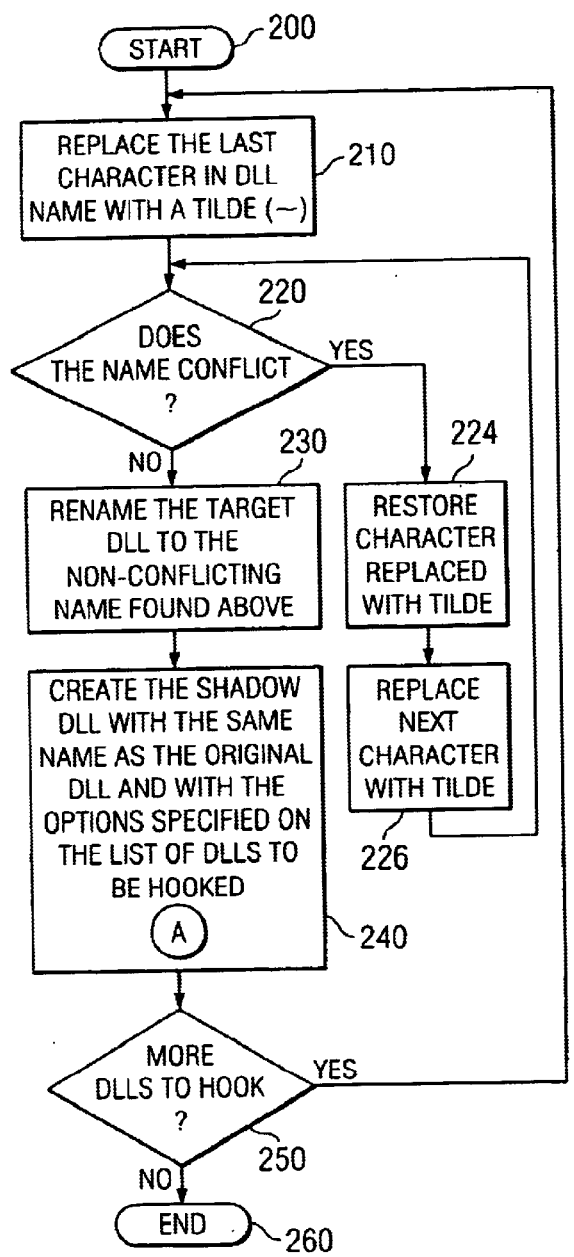

Referring now to FIGS. 4A–4I, a flowchart illustrating the present invention is shown. FIGS. 4A–4I illustrate a process for generating an apparatus or tool for performing demand load analysis. The process starts in step 200 as illustrated in FIG. 4A. The process first renames the original DLL, and then it creates a shadow DLL with the same name as the original DLL. Externally, the shadow DLL looks just like the original or target DLL. It has the same DLL name and the same name and number of external interfaces or exports as the original. The original DLL is renamed so that the shadow DLL can be given its name. All references to the original DLL get resolved to the shadow DLL. When called, the shadow DLL is first loaded and then performs the entry hook processing and performs the call, via demand loading code, on the original DLL wherein load initialization of the original DLL is performed. When the original DLL returns from the call, the shadow DLL performs the exit hook processing and returns to the original caller. If the original DLL is referenced but not called the shadow DLL is still loaded whereas the original DLL is not loaded according to the demand loading protocol.

Renaming the original DLL requires both the external and internal DLL names to be changed. The DLLRNAME tool from the IBMCPP compiler can be used but does not work for lower case internal names. The present invention utilizes a similar utility to rename DLLs with both upper and lower case internal names. The OS/2 executable module format makes it difficult to rename a DLL to a name with a different length; therefore, in OS/2, the present invention uses a new name with the same length as the original. Name conflicts must be avoided. The name selection and conflict avoidance algorithm is illustrated in FIG. 4A. In step 210, the last character in the original DLL name is replaced with a tilde (0) character. In step 220, the process determines whether there is a naming conflict between the renamed target DLL and any other software modules utilized in or by the application program executable. If no conflict exists, the process proceeds to step 230 wherein the target DLL is renamed to the non-conflicting name. If a conflict does exist, the process proceeds to step 224 wherein the character replaced with the tilde is restored. The process proceeds from step 224 to step 226 wherein the next character in the DLL name is replaced with a tilde. After the first iteration, the second to last character is changed, and the process proceeds in a similar manner until the last iteration wherein the first character of the name is changed. The process proceeds from step 226 and loops back to step 220 where it is determined whether a conflict exists. If there is still a name conflict after each character of the DLL name has been replaced with the tilde character, other special characters, like pound sign (#) and underscore (_) characters may be utilized in a similar fashion. The process then proceeds to step 240 wherein a shadow DLL with the same name as the original DLL and with options specified on a list of DLLs to be demand load analyzed via tracing, is created in step 240. The process then proceeds to step 250 where it is determined whether there are any more DLLs to be demand load analyzed via tracing. If there are more DLLs to be demand load analyzed, the process returns to step 210. If there are no more DLLs to be demand load analyzed, the process ends in step 260.

Figure 4B:
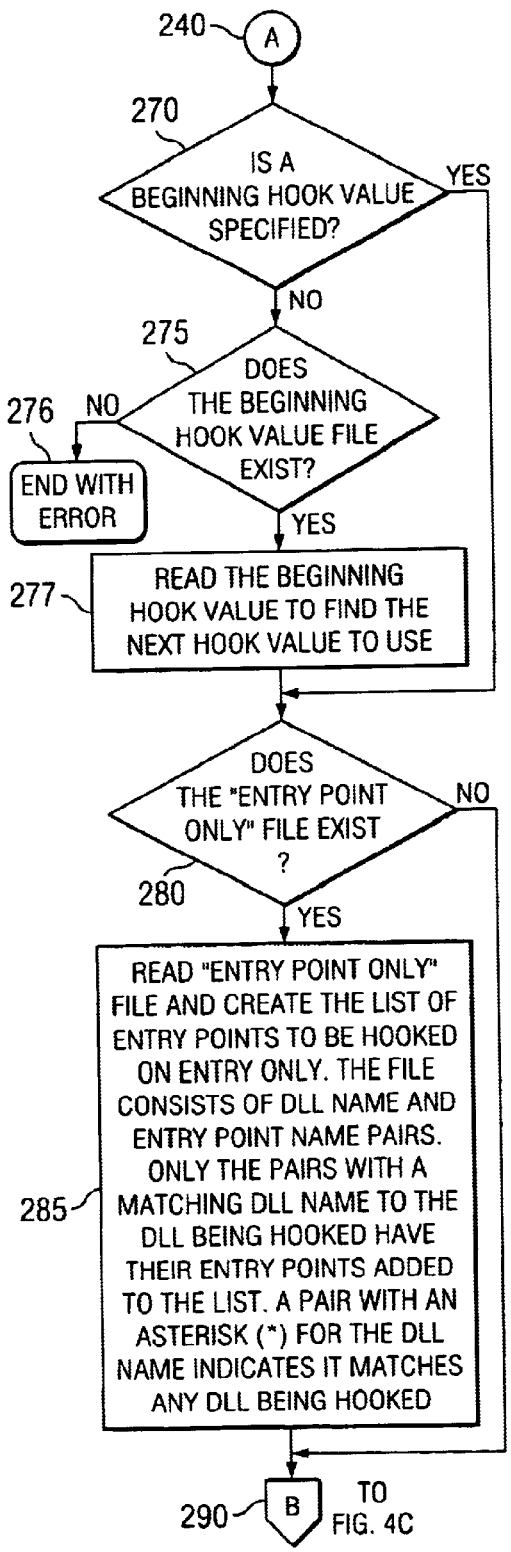

Referring now to FIG. 4B, step 240 includes the following substeps. In step 270, it is determined whether a beginning hook value is specified. If a beginning hook value is specified, the process proceeds to step 280. If a beginning hook value is not specified, the process proceeds to step 275. In step 275, it is determined whether a beginning hook value file exists. If no beginning hook value file exists, the process ends in step 276 with an error. If the beginning hook value file does exist, the process proceeds to step 277 wherein the beginning hook value file is read to find the next hook value to use. The process then proceeds to step 280. In step 280, a determination is made to determine if an entry point only file exists. If an entry point only file does not exist, the process proceeds to step 290. If an entry point only file does exist, the process proceeds to step 285. In step 285, the entry point only file is read, and a list of entry points to be hooked on entry only is created. The entry point only file consists of DLL name and entry point name pairs. Only the pairs with a matching DLL name to the DLL being hooked have their entry points added to the list. A pair with an asterisk for the DLL name indicates it matches any DLL being hooked. After completing step 285, the process proceeds to step 290.

Figure 4C:
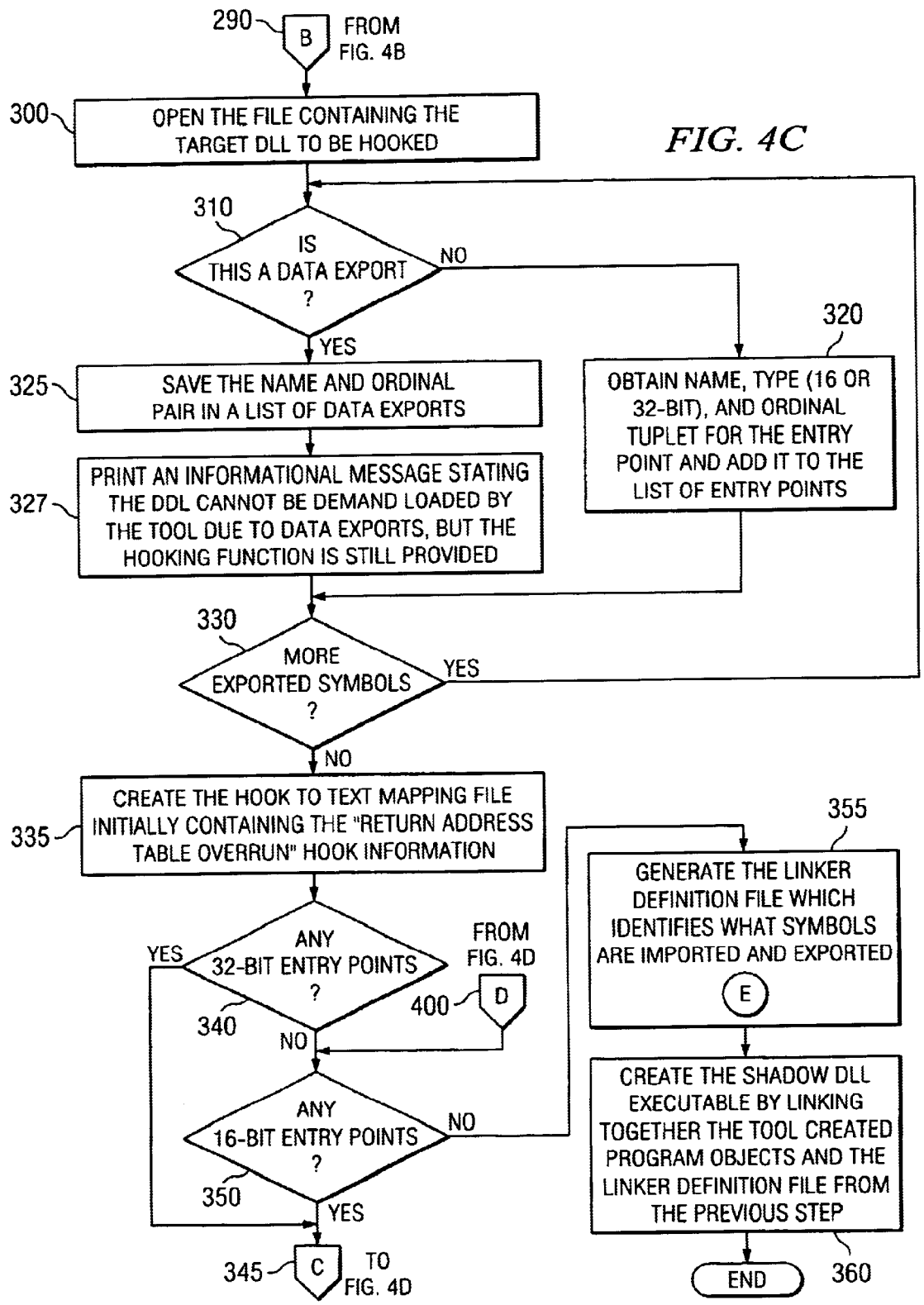

Referring now to FIG. 4C, the process for listing the entry points of the target DLL and creating the shadow DLL is illustrated starting with step 290. In step 300, a file containing the target DLL to be hooked or demand load analyzed is opened. In step 310, for each exported symbol of the target DLL, it is determined whether the export is a data export. If the export is not a data export, the process proceeds to step 320 where the name, type, and ordinal for the entry point is obtained and added to the list of entry points. If the export is a data export, the process proceeds to step 325 where the name and ordinal pair is saved in a list of data exports. After completing step 325, the process proceeds to step 327 wherein an informational message stating that the DLL cannot be demand loaded by the tool due to data exports but that the hooking function for entries to the DLL is still provided is printed. Here, the shadow DLL is generated even when data exports are encountered so that tracing may still be performed. After completing either step 320 or step 327, the process proceeds to step 330 where a determination is made whether there are any more exported symbols. If there are more exported symbols, the process returns to step 310. If there are no more exported symbols, the process proceeds to step 335 wherein a hook to text mapping file initially containing a return address table overrun hook information is created. The process then proceeds to step 340 where a determination is made whether any 32-bit entry points exist in the target DLL to be hooked. If the target DLL contains any 32-bit entry points, the process proceeds to step 345. In step 350, a determination is made whether there are any 16-bit entry points in the target DLL. If there are any 16-bit entry points in the target DLL, the process proceeds to step 345. If there are no 16-bit entry points in the target DLL, the process proceeds to step 355. In step 355, a linker definition file which identifies what symbols are imported and exported is generated. The process then proceeds to step 360 wherein the shadow DLL executable code is created by linking together the created program objects and the linker definition file from step 355.

Figure 4D:
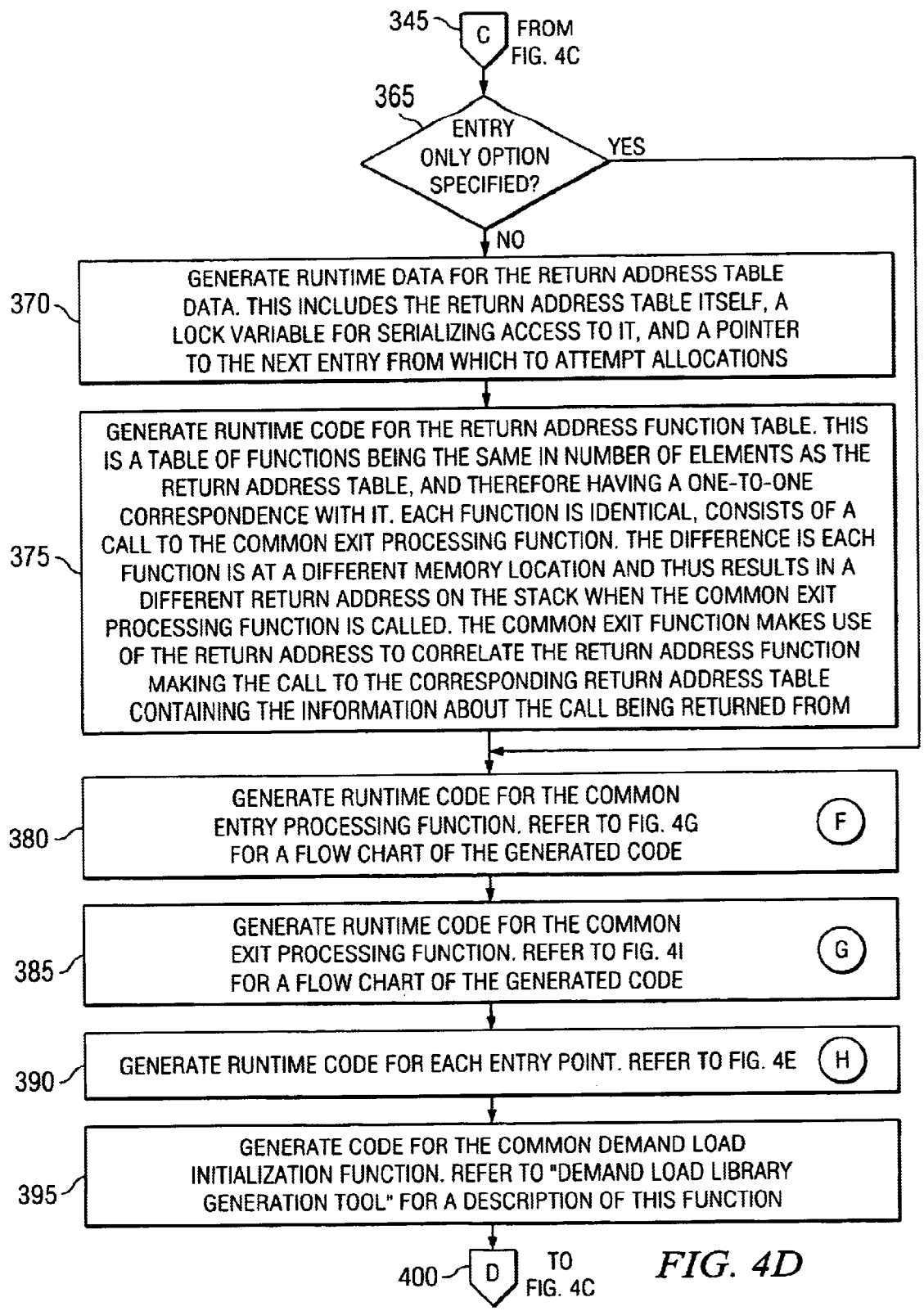

From step 345, the process proceeds to step 365 wherein a determination is made whether an entry only option is specified (see FIG. 4D). If the entry only option is not specified, the process proceeds to step 370. In step 370, run time data for the return address table data is generated. This includes the return address table itself, a lock variable for serializing access to it, and a pointer to the next entry from which to attempt allocations. The process then proceeds to step 375 wherein run time code for the return address function table is generated. This is a table of functions having the same number of entries as the return address table and, therefore, a one-to-one correspondence with it. Each function is identical in that it consists of a call to a common exit processing function. The difference is that each function is at a different memory location and thus results in a different return address on the stack when the common exit processing function is called. The common exit function makes use of the return address to correlate the return address function making the call to the corresponding return address table containing the information about the call being returned from. After completing step 375, the process proceeds to step 380. If the entry only option is not specified in step 365, the process proceeds to step 380, thereby skipping steps 370 and 375. In step 380, run time code for a common entry processing function is generated. The process proceeds from step 380 to step 385 wherein run time code for a common exit processing function is generated. In step 390, run time code for each entry point is generated. The process then proceeds to step 395 wherein code for the demand load initialization function is generated. For further description of the demand load initialization function, see U.S. patent application Ser. No. 08/742,103, U.S. Pat. No. 6,003,095. The process then proceeds to step 400.

Figure 4E:
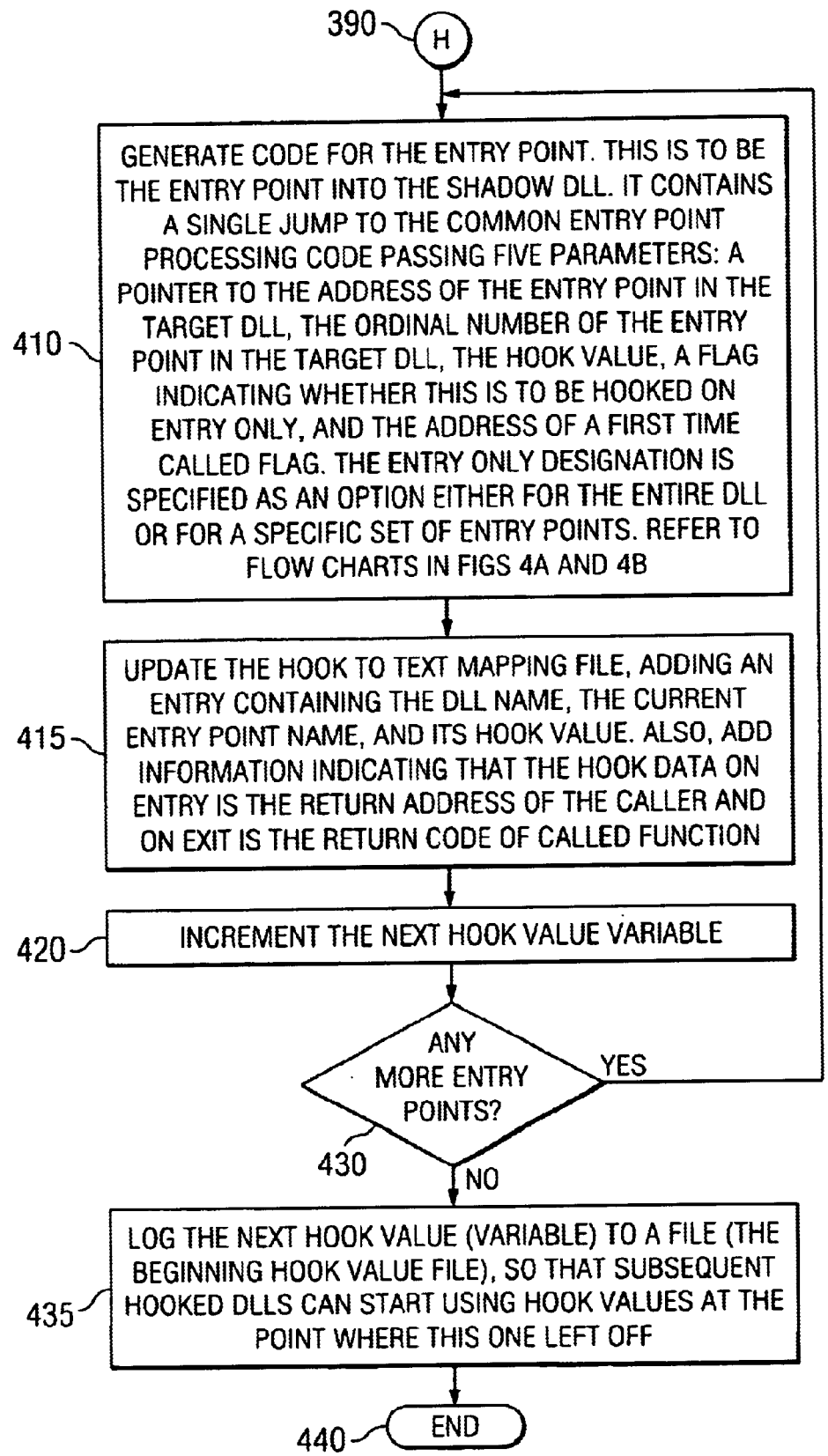

Referring to FIG. 4E, the substeps of step 390 are illustrated. In step 410, code for the entry point is generated. The code, preferably written in assembly language, is a single jump to the common entry point processing code passing five parameters: a pointer to the address of the entry point in the target DLL, the ordinal number of the entry point in the target DLL, the hook value, a flag indicating whether this is to be hooked on entry only, and the address of a first time called flag. The entry only designation is specified as an option, either for the entire DLL or for a specific set of entry points. After completing step 410, the process proceeds to step 415 wherein the hook to text mapping file is updated by adding an entry containing the DLL name, the current entry point name and its hook value. Also, information indicating that the hook data on entry is the return address of the caller and on exit is the return code of the called function is added. In step 420, the hook value variable is incremented. In step 430, a determination is made whether there are any more entry points. If there are more entry points, the process returns to step 410. If there are no more entry points, the process proceeds to step 435 wherein the next hook value variable is logged to a file referred to as the beginning hook value file so that subsequent hooked DLLs can start using hook values at the point where this one left off. The process then proceeds to step 440 where the substeps of process 390 are complete.

Figure 4F:
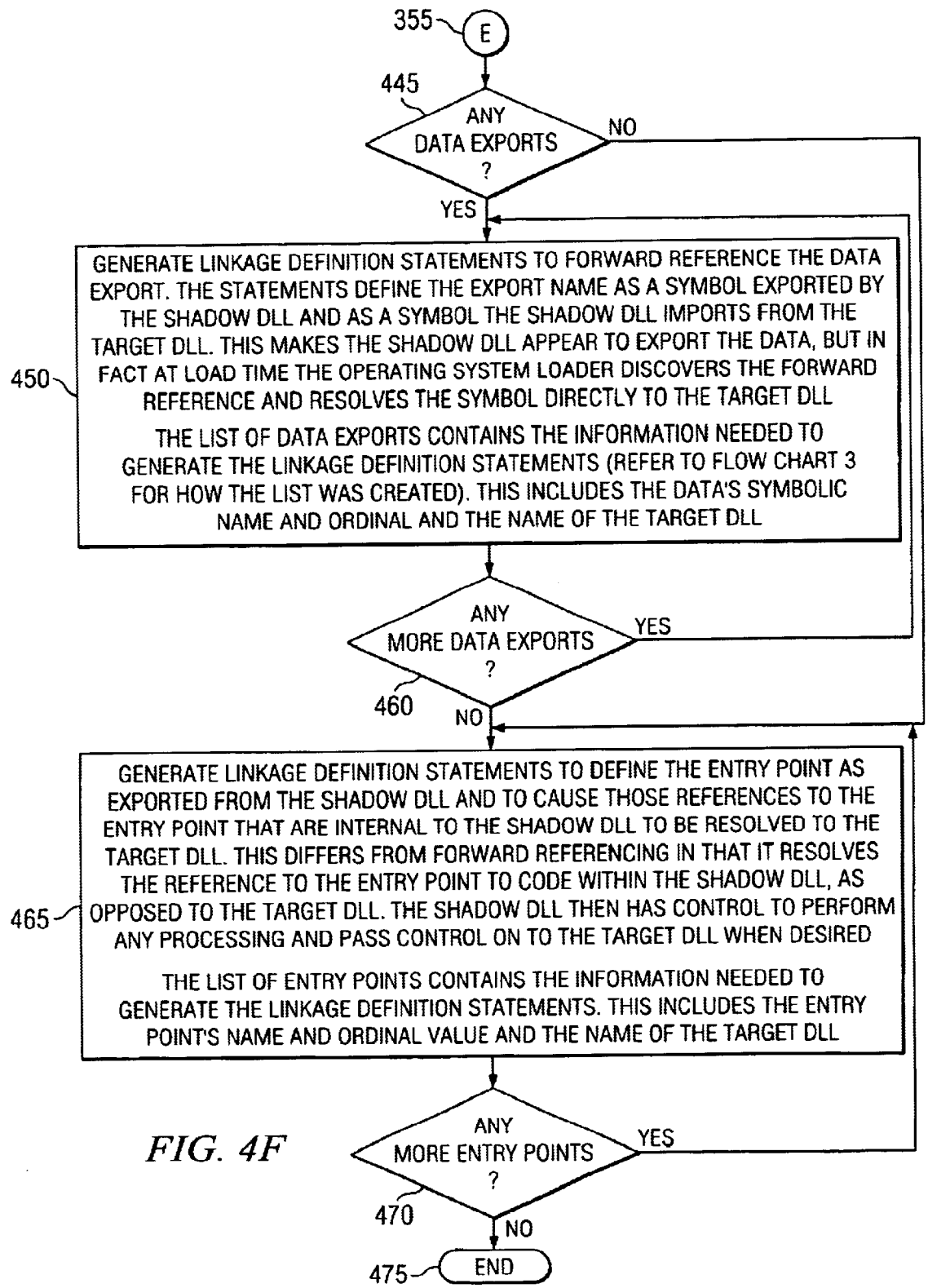

Referring now to FIG. 4F, the subprocesses of step 355 will be described. In step 445, a determination is made whether there are any data exports. If there are data exports as determined in step 445, the process proceeds to step 450 wherein linkage definition statements to forward reference the data export are generated. The statements define the export name as a symbol exported by the shadow DLL and as a symbol the shadow DLL imports from the target DLL. This makes the shadow DLL appear to export the data but, in fact, at load time the operating system loader discovers the forward reference and resolves the symbol directly to the target DLL. The list of data exports contains the information needed to generate the linkage definition statements. This includes the data's symbolic name and ordinal and the name of the target DLL. The process then proceeds to step 460 where a determination is made whether there are any more data exports. If there are any more data exports, the process returns to step 450. If there are no data exports, as determined in step 445, the process proceeds directly to step 465 wherein linkage definition statements to define the entry point as exported from the shadow DLL and to cause those references to the entry point that are internal to the shadow DLL to be resolved to the target DLL are generated. This differs from forward referencing in that it resolves the reference to the entry point to code within the shadow DLL as opposed to the target DLL. The shadow DLL then has control to perform any processing and pass control on to the target DLL when desired. The list of entry points contains the information needed to generate the linkage definition statements. This includes the entry point's name, ordinal value and the name of the target DLL. After completing step 465, the process proceeds to step 470 where a determination is made whether there are any more entry points in the list of entry points. If there are any more entry points, the process returns to step 465. If there are no more entry points, the process proceeds to step 475 wherein the substeps of step 355 are complete and a linker definition file is ready for use.

Figure 4G:
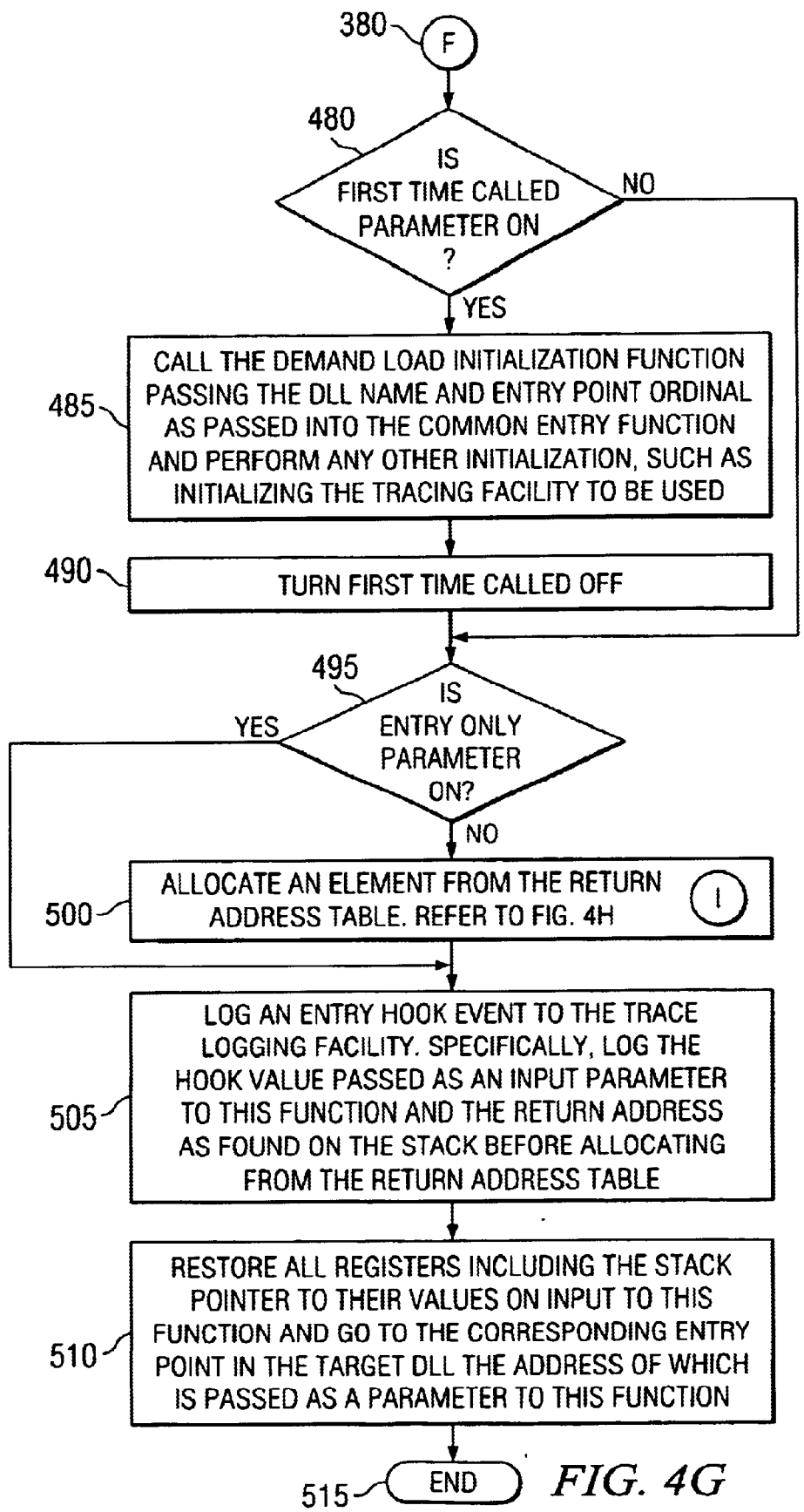

Referring now to FIG. 4G, the substeps of step 380 will be described. In step 480, a determination is made whether a first time called parameter is on. If the first time called parameter is on, the process proceeds to step 485. In step 485, the demand load initialization function is called passing the DLL name and entry point ordinal as similarly passed to the common entry function. Also, in step 485, any other required initialization is performed such as initializing the tracing facility to be used. After initialization is completed in step 485, the process proceeds to step 490 where the first time called parameter is turned off wherein the process then proceeds to step 495. If it is determined that the first-time-called parameter is off in step 480, the process proceeds directly to step 495. In step 495, a determination is made whether the entry-only parameter is on. If the entry-only parameter is not on as determined in step 495, the process proceeds to step 500 wherein an element from the return address table is allocated. After completion of step 500, the process proceeds to step 505. If the entry-only parameter is on, the process proceeds directly to step 505 bypassing step 500. In step 505, an entry hook event is logged to the trace logging facility, specifically the hook value passed as an input parameter to this function, and the return address as found on the system or program stack is logged to the trace logging facility. The process then proceeds to step 510 wherein all registers are restored to their values on input to this function. The process then jumps to the corresponding entry point in the target DLL, the address of which was passed as a parameter to this function. The substeps of step 380 then end in step 515.

Figure 4H:
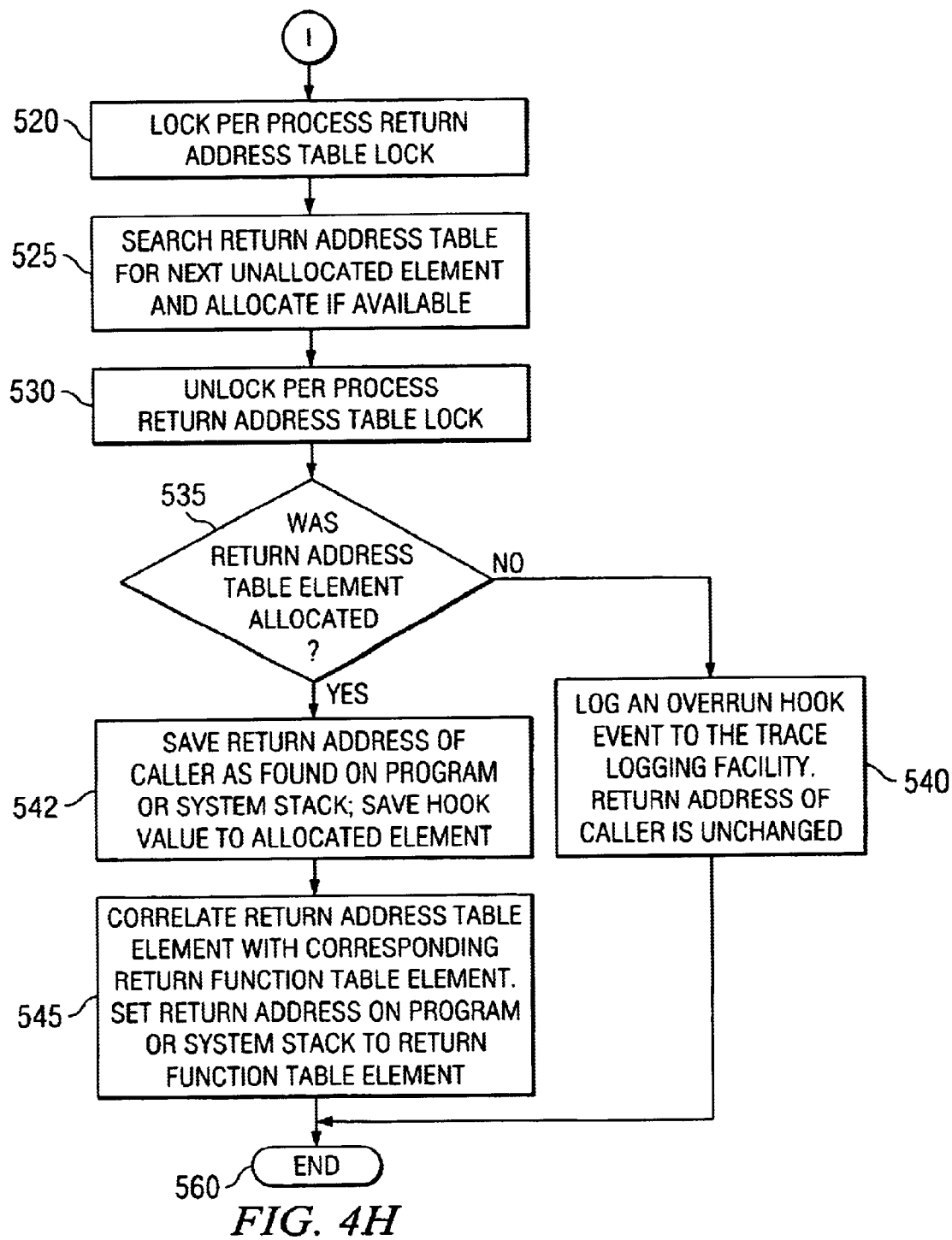
Figure 41:
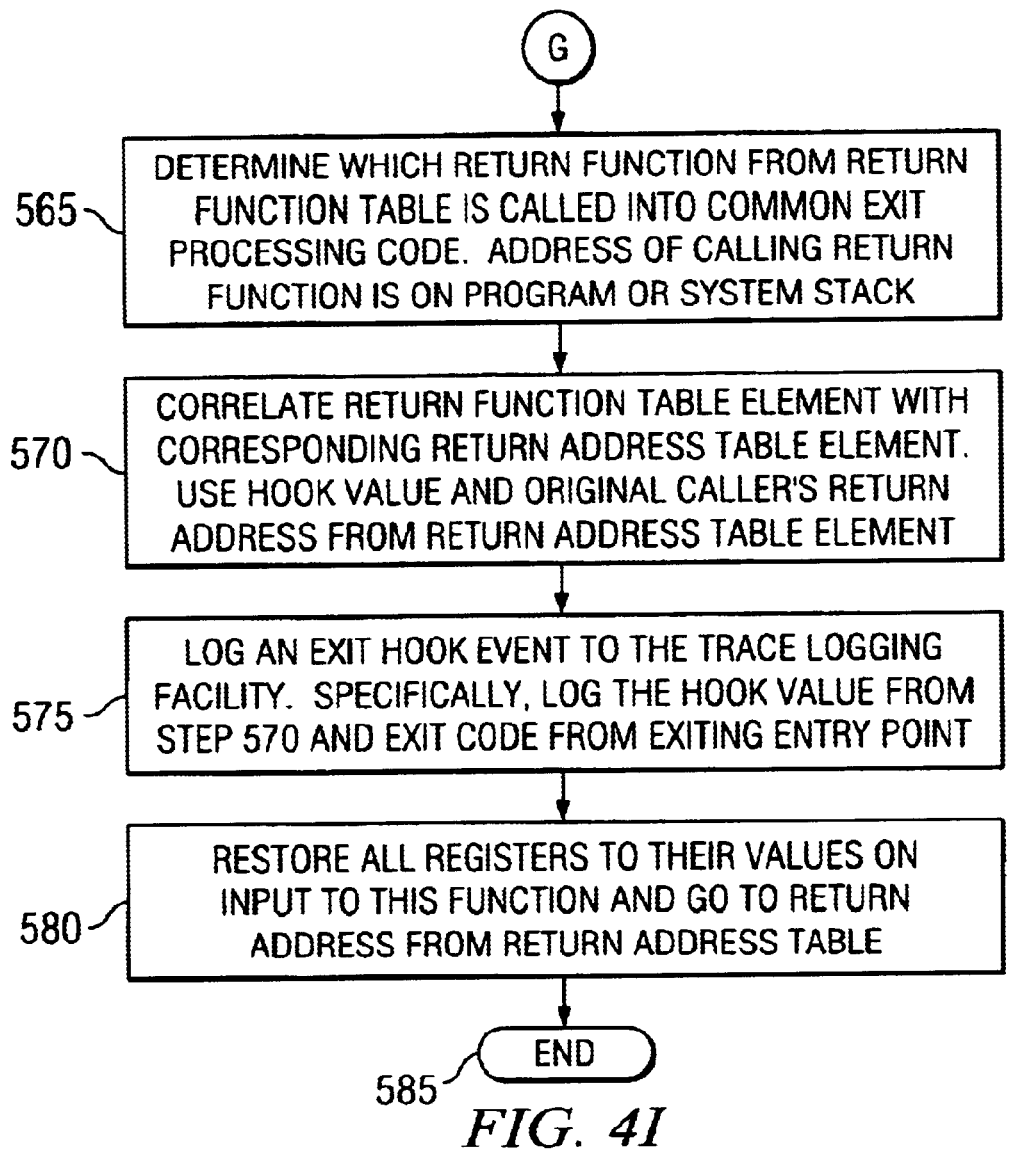

Referring now to FIG. 4H, the process for allocating a return address table element in step 500 will be further described with references to the sub-method steps. In step 520, a per process return address table lock is locked. In step 525, an element from the return address table is allocated. The algorithm is a simple linear search for the next unallocated element. The search starts at the next element after the last allocated element and proceeds in a circular fashion, until either an unallocated element is found or the whole table has been examined. By circular fashion, it is meant that the search wraps to the beginning of the table when the end is reached and an unallocated element is yet to be found, and there are elements yet to be examined. In step 530, the per process return address table lock is unlocked. In step 535, a determination is made whether a return address table element was allocated. If a return address table element was not allocated, the process proceeds to step 540 where a return address table overrun hook event is logged to the trace logging facility. The return address of the caller is left unchanged on the program or system stack, causing only the entry of the call to be hooked. After completion of step 540, the process proceeds to step 560 where the process for allocating a return address table element ends. If an element was allocated as determined in step 535, the process proceeds to step 542 where the following things in the allocated return address table element are saved: the return address of the caller as found on the program or system stack, and the hook value as passed on input to this function. After completion of step 542, the process proceeds to step 545 wherein the return address table element is correlated with the corresponding return function table element. The return address on the program or system stack is set to this return function table element. After completion of step 545, the process proceeds to step 560 where the process for allocating a return address table element is completed.

Referring now to FIG. 4I, the substeps of the process in step 385 for generating run time code for the common exit processing function will be described. In step 565, a determination is made which return function from the return function table called into the common exit processing code. The address of the calling return function is on the program or system stack. In step 570, the return function table element is correlated with the corresponding return address table element. The hook value to use and the original caller's return address is obtained from the return address table element. In step 575, an exit hook event is logged to the trace logging facility, specifically the hook value obtained from the previous step 570 and the exit code from the exiting entry point is logged to the trace locking facility. The process then proceeds to step 580 where all registers are restored to their original values on input to this function. The process jumps to the return address obtained from the return address table. After completion of step 580, the process for common exit processing is completed in step 585.

FIGS. 4A–4I illustrate a process for generating a demand load analysis tool wherein a shadow DLL including demand load code is generated. This is as opposed to including the demand load code into the calling executable, requiring it to be re-linked. The advantage is that the demand load function is provided without access to or modification of the source code of either the calling executable or the called DLL. The created shadow DLL performs both the demand loading and entry point hooking of the called DLL. Being able to provide these functions without need for source code makes this tool very useful for demand load analysis.

Figure 5:
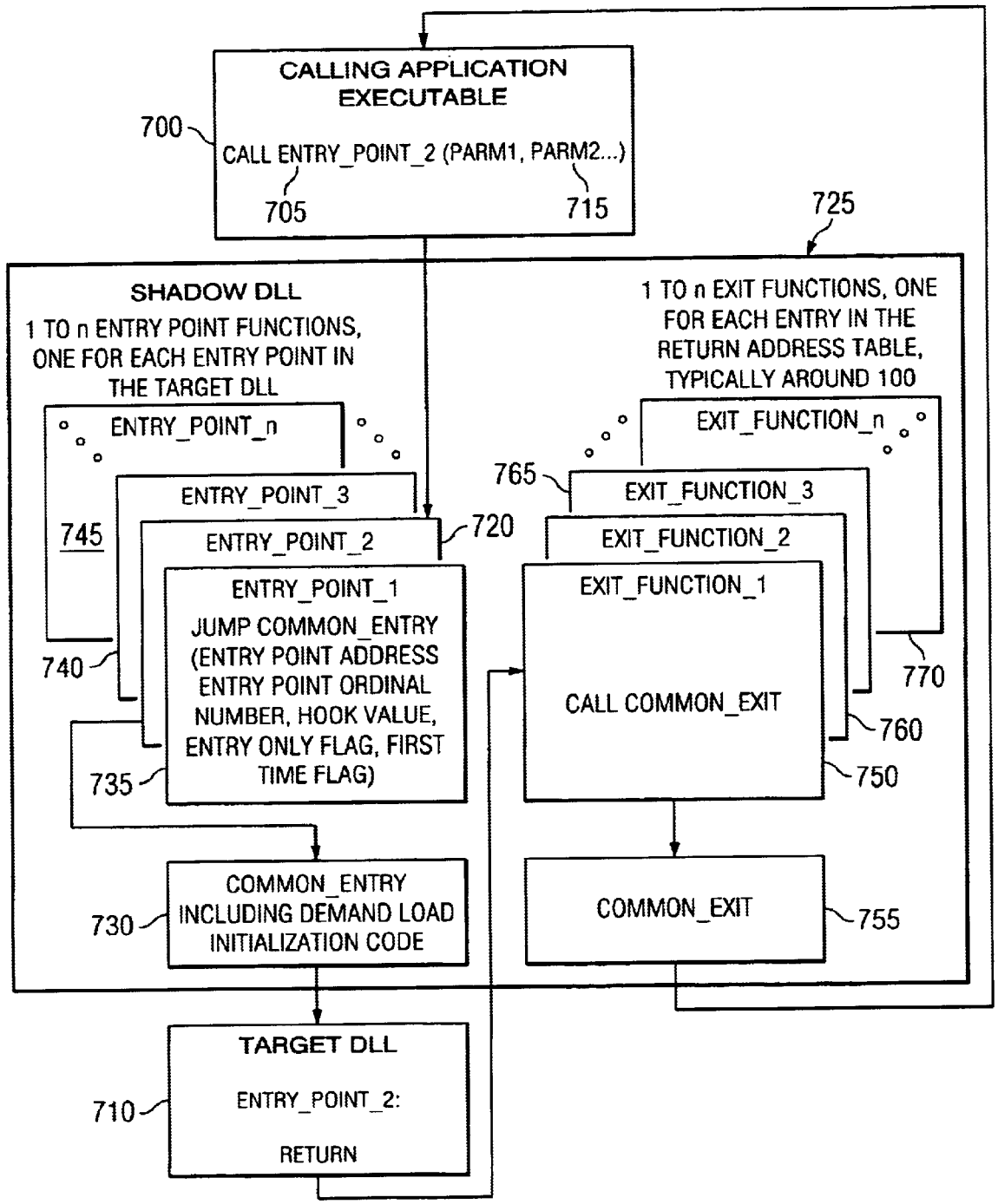
FIG. 5 illustrates an example of the contents of a calling application program executable, a shadow dynamic link library, and a target dynamic link library according to the present invention.

Referring now to FIG. 5, an example of the contents of and operation of the apparatus and method of the present invention will be described. Calling application executable program 700 contains a call to a specific entry point of a target DLL 710. The entry point call 705 contains references to call parameters 715. Call 705 to the entry point to target DLL 710 calls corresponding entry point function 720 in shadow DLL 725. Entry point 720 contains programming code which contains the instruction of jumping to common entry code and demand load initialization code 730 while passing the parameters of entry point address, entry point ordinal number, hook value, entry only flag, and first time flag. Shadow DLL 725 contains entry point functions 735, 740, 745 for each entry point in the target DLL 710. After jumping to the common entry code 730, the common entry then jumps to target DLL 710 which then returns to exit function 750 in shadow DLL 725. It will be appreciated that there need not be any relationship between the entry point called and the return function table entry used. Simply, the next available return function is used. Exit function 750 contains a call to a common exit function 755. Shadow DLL 725 contains exit functions 760, 765, and 770, one for each entry in the return address table. Common exit function 755 returns to the calling application program executable 700.

Figure 6A:
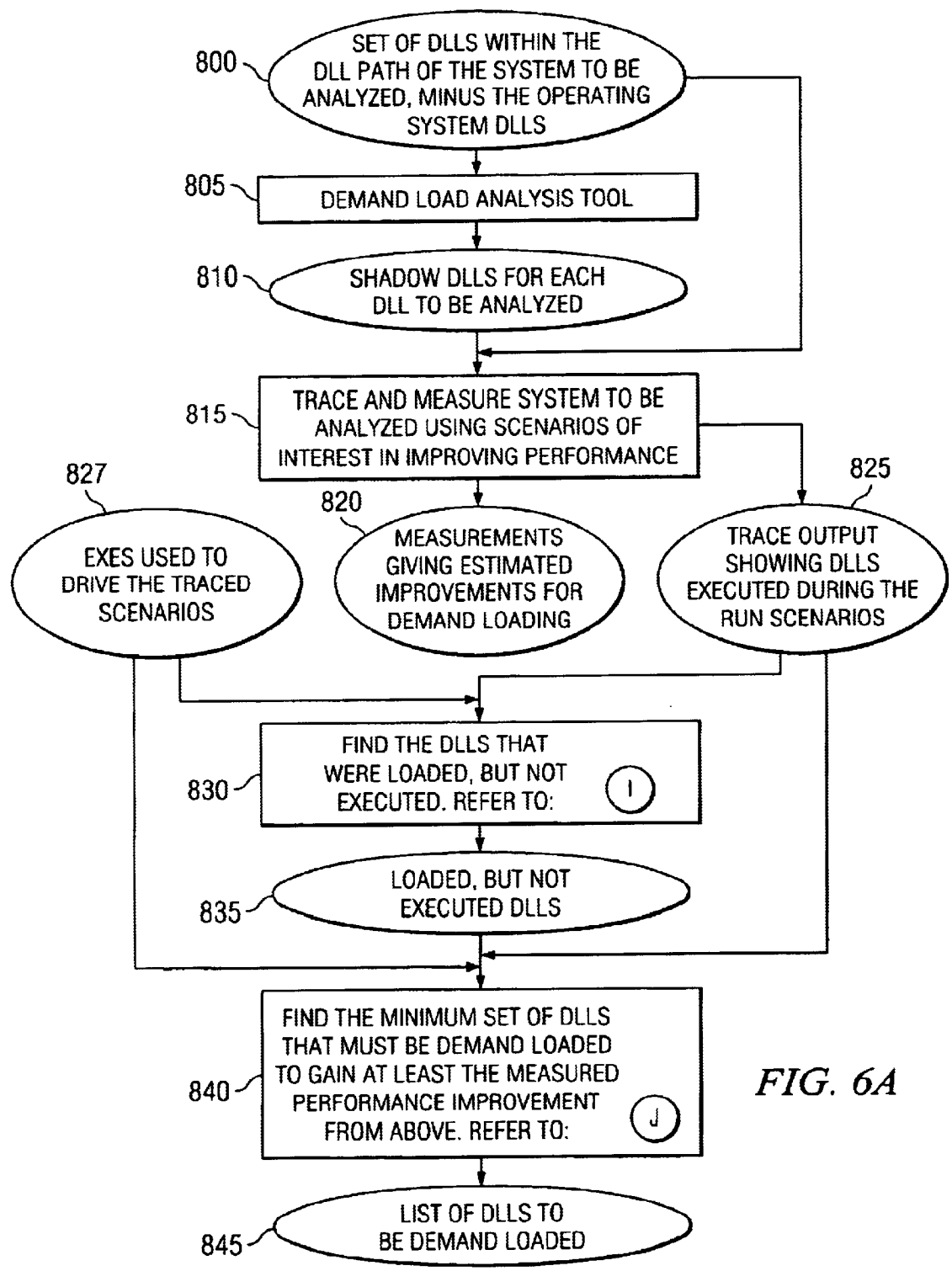
FIGS. 6A–6C illustrate a demand load analysis method according to the present invention.
Figure 6B:
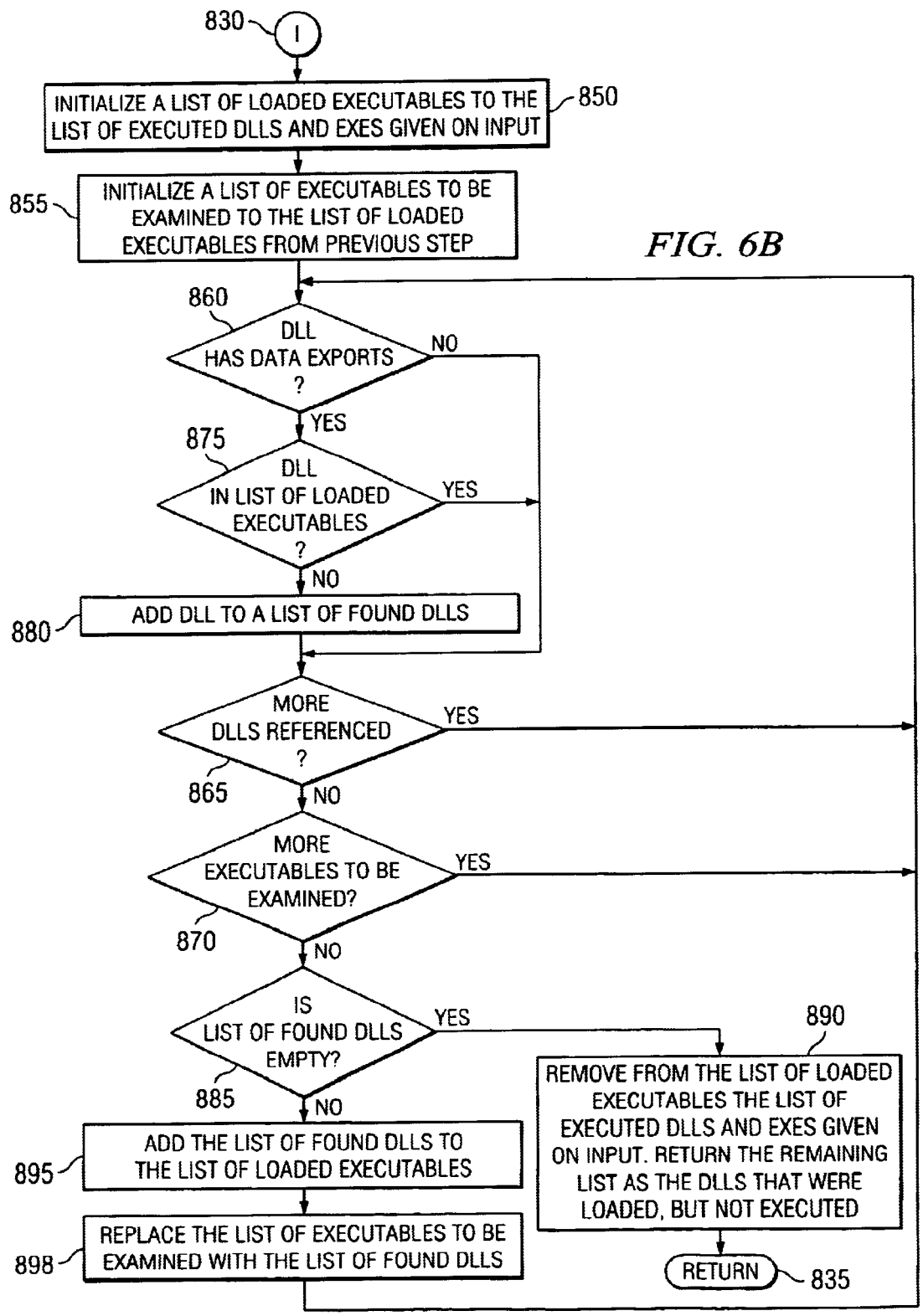
Figure 6C:
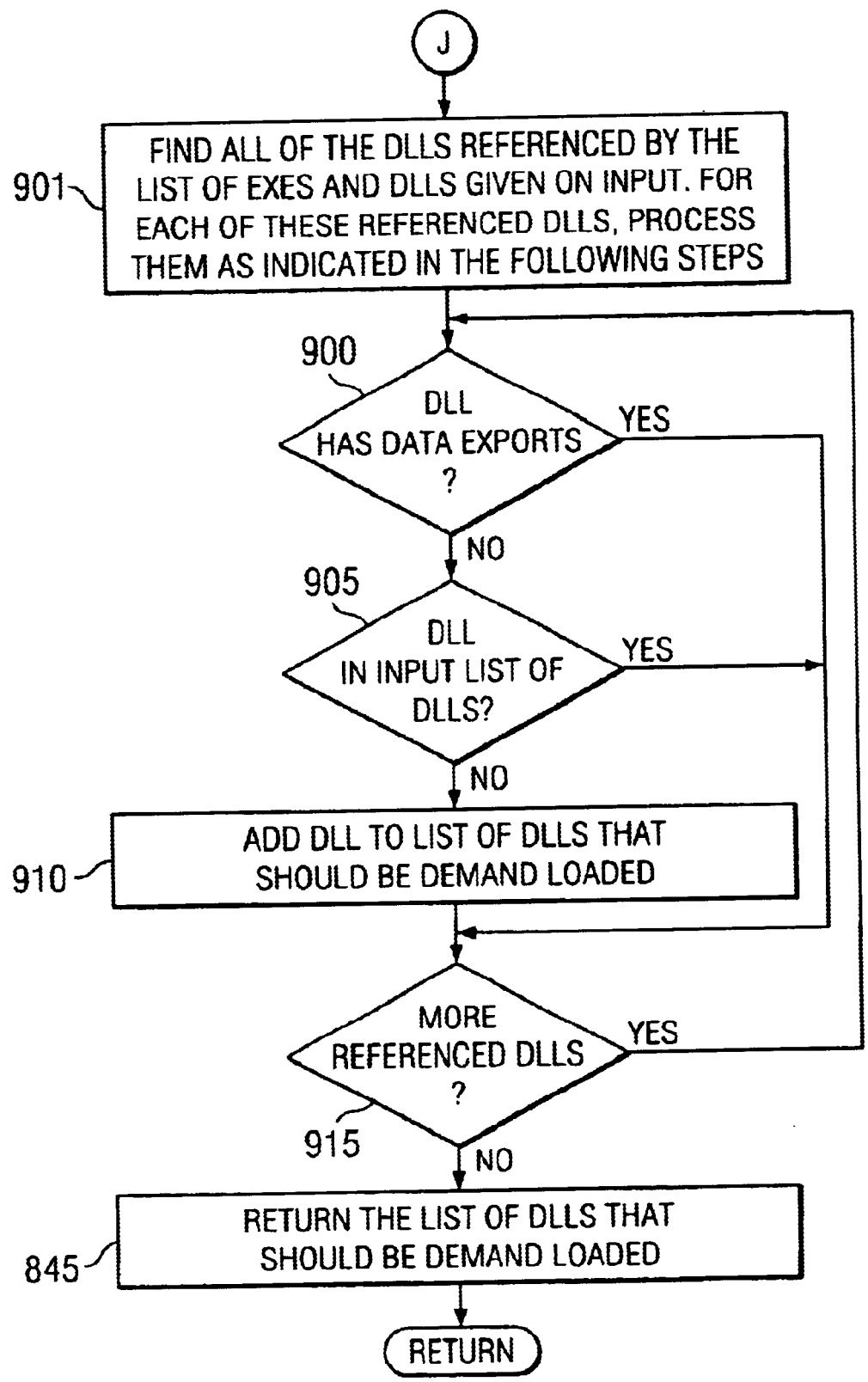

Referring now to FIGS. 6A–6C, a method which utilizes the demand load analysis tool generated in FIGS. 4A–4I for selecting or identifying DLLs to be demand loaded and for determining program execution performance improvement resulting from demand loading DLLs will be described. The process starts with step 800. In step 800, the reference set of DLLs for the product being developed is determined. This may be accomplished by using the tool CHKDLL32 which prints out the entire DLL reference chain giving the list of DLLs that are referenced for a given executable. Each executable (EXE) in the product being developed is checked. The union of the outputs is the referenced set of DLLs. Included in this set is DLLs from other products but not the DLLs from the operating system. Typically, applications tend to need the operating system DLLs for their base operation so are less likely to benefit from demand loading. However, it will be appreciated that the present invention may be utilized to perform demand load analysis for operating system DLLs. In step 805, the demand load analysis tool generated and described in connection with FIGS. 4A–4I is applied to the referenced set of DLLs from step 800. Here, the demand load analysis tool produces output which includes the name of the DLL being called and a shadow DLL for each DLL to be analyzed as generated in step 810. The process then proceeds to step 815 wherein the system or application program to be analyzed is traced and measured using scenarios of interest for improving performance, i.e. execution time of the application program. The DLLs in the application program are traced using the shadow DLLs from step 810. The measurement information gained in step 815 gives a lower bound to the expected improvement that comes from demand loading those DLLs which can be demand loaded. It is to be understood that more performance improvement may be achievable by using a demand load library as generated and described in U.S. patent application Ser. No. 08/742,103, U.S. Pat. No. 6,003,095, which has less overhead than the demand load analysis tool. These measurements giving estimated improvement for demand loading are stored in step 820. The trace outputs showing a list of executed DLLs is also an output of step 815 and is stored in step 825.

The demand load analysis tool is applied to every DLL in the set of candidates for demand loading. A benefit to using the demand load analysis tool to analyze demand loading as opposed to the direct use of the demand load library tool described in U.S. patent application Ser. No. 08/742,103, U.S. Pat. No. 6,003,095, is the ease of its use and time saved from not having to re-link the majority of the product under development. The demand load analysis tool only affects DLLs of interest and does not require access to the product source code whereas the demand load library tool affects all the callers of the DLLs of interest and requires access to the product's build tree. The greater efficiency of the code generated by the demand load library tool makes it the choice for the product once the analysis is complete. The demand load analysis tool also is not desirable for the final product because it generates shadow DLLs which are extra files that would have to be shipped with the product. The time savings for using the demand load analysis tool as opposed to the demand loading tool is magnified when demand loading analysis becomes iterative, as it quite often does because the candidate set of DLLs to be demand loaded is not always obvious. Several experiments experience must be run to come up with an optimum set. Step 825 is an output of step 815 and an input to step 830. In step 830, the DLLs that were loaded but not executed are identified. In step 827, the executables used to drive the trace scenarios of step 815 are inputted into step 830 so that for each executable referencing DLLs, the DLLS that are loaded but not executed are identified. Step 827 outputs the list of executables known as EXEs which are the main starting point for processes, whereas step 825 is the list of executables known as DLLs. It is possible to combine objects 827 and 825 as being an output of step 815 and call it the set of executables (EXEs and DLLs) that were executed during the traced scenarios. The output of step 830 is step 835 which is a list of the loaded but not executed DLLs which represents the candidate set of DLLs for demand loading. In step 840, the minimum set of DLLs that must be demand loaded to gain at least the measured performance improvement determined in step 820 is identified. It is important to note that the shadow DLL gets loaded at process time and the target DLL gets demand loaded. Although the set of the two DLLs, i.e. the shadow DLL and the target DLL, is not exactly the same as what would be produced by the demand load library tool, it is close enough to evaluate the performance benefit. The added load time for the generated shadow DLL is insignificant considering its small size. In step 845, the list of DLLs to be demand loaded is generated.

FIG. 6B illustrates the substeps of step 830 wherein, from the executed list of EXEs and DLLs, the DLLs which are loaded but not executed are identified. In step 850, a list of loaded executables is initialized to the list of executed DLLs and EXEs given on input. The process proceeds to step 855 wherein a list of executables to be examined is initialized to the list of loaded executables from step 850. In step 860, a determination is made whether a DLL referenced by the current executable being examined has data exports. If the DLL does not contain any data exports, the process proceeds to step 865 where a determination is made whether the current executable-being examined references any more DLLs. If the current executable references more DLLs, the process returns to or loops back to step 860. If the current executable does not reference any more DLLs the process proceeds to step 870. If a DLL has data exports as determined in step 860, the process proceeds to step 875. In step 875, a determination is made whether the DLL is in the list of loaded executables. If a DLL is not in the list of loaded executables, the process proceeds to step 880 where the DLL is added to a list of found DLLs which represent the DLLs which are loaded but not executed and might benefit from demand loading. After completion of step 880, the process proceeds to step 865. In step 870, a determination is made whether more executables are to be examined. If more executables are to be examined, the process loops back to or returns to step 860. If more executables are not to be examined, the process proceeds to step 885. In step 885, a determination is made whether the list of found DLLs is empty. If the list of found DLLs is empty, the process proceeds to step 890. In step 890, the list of executed DLLs and EXEs given on input is removed from the list of loaded executables. The remaining list is returned as the DLLs that were loaded but not executed in step 835. If the list of found DLLs is not empty as determined in step 885, the process proceeds to step 895. In step 895, the list of found DLLs is added to the list of loaded executables. The process then proceeds to step 898 wherein the list of executables to be examined is replaced with the list of found DLLs. After completion of step 898, the process returns to or loops back to step 860 wherein for each executable in the list of executables to be examined and for each DLL referenced by the current executable being examined the process is repeated.

Referring now to FIG. 6C, the substeps of step 840 will be described. In step 901, all of the DLLs directly referenced by the input list of EXEs and DLLs are found. Each of the referenced DLLs is processed in the manner described in the following steps. In step 900, a determination is made whether a DLL has data exports. If the DLL does not have data exports, the process proceeds to step 905 wherein a determination is made whether the DLL is in the input list of DLLs. If the DLL is not in the input list of DLLs, as determined in step 905, the process proceeds to step 910. In step 910, the DLL is added to the list of DLLs that should be demand loaded. After completion of step 910, the process proceeds to step 915 wherein a determination is made whether there are any more referenced DLLs. If there are no more referenced DLLs, the process proceeds to step 845 wherein the list of DLLs that should be demand loaded is returned. If either the DLL has data exports as determined in step 900 or the DLL is in the input list of DLLs, as determined in step 905, then the process proceeds to step 915 directly. If it is determined that there are more referenced DLLs, as found in step 915, the process returns to or loops back to step 900.

The minimum set of DLLs that must be demand loaded to gain at least the performance improvement set forth in step 820 are the DLLs which do not have data exports and are directly referenced by but do not include the following: executed DLLs and EXEs or DLLs that were loaded but not executed. The method illustrated in FIGS. 6A–6C is one exemplary usage of the demand load analysis tool. Therefore, the tool identifies which DLLs can easily be demand loaded and approximately how much benefit comes from demand loading them. The above method also identifies DLLs that were loaded but not executed.

Although the above describes a shadow DLL which intercepts entries to or exits from a target DLL to provide the additional functions of tracing and demand loading without modification or access to the program of instructions of the target DLL, it will be appreciated that the present invention is equally applicable to any shadow software module which intercepts entries to or exits from a software module which executes a first function so that a second function not provided by the software module may be executed. For example, the present invention may be used for selectively replacing or adding functions to a software module without accessing the program of instructions of the software module. The shadow software module of the present invention may also be used to route a call to the software module to another software module which provides a second function.

Although the present invention and its advantages have been described in detail, it should be understood that various changes, substitutions and alterations can be made herein without departing from the spirit or scope of the invention as defined in the appended claims.

What is claimed is:

1. A method, implemented in an information handling system, for selecting one or more dynamic link libraries (DLLs), utilized in an application program, to be demand loaded, said method comprising the steps of:

identifying a DLL referenced by the application program;

tracing outputs from the DLL;

examining the traced output of the DLL to determine whether the DLL was executed; and selecting the DLL to be demand loaded if the DLL was not executed.

2. The method, as recited in claim 1, further including the steps of:

determining whether the DLL contains data exports; and selecting the DLL to be demand loaded if the DLL does not contain data exports.

3. The method, as recited in claim 1, further comprising the step of demand loading the DLL.

4. The method, as recited in claim 1, further comprising the step of generating a shadow DLL for performing said tracing step.

5. The method, as recited in claim 4, further comprising the step of generating a shadow DLL for performing demand loading of said DLL.

6. The method, as recited in claim 5, further comprising the step of loading said shadow DLL upon reference by said application program.

7. The method, as recited in claim 1, further comprising the step of loading said DLL only if said application program requires execution of said DLL.

8. The method, as recited in claim 1, further comprising the step of identifying a minimum set of DLLs, from the application program, to be demand loaded to achieve a predetermined improved execution time.

9. A computer program product, comprising:

a program storage device readable by a computer system tangibly embodying a program of instructions executable by said computer system for identifying one or more DLLs, from an application program, to be demand loaded, said program of instructions implementing the following method:

identifying a DLL referenced by the application program;

tracing the outputs from the DLL;

examining the traced output of the DLL to determine whether the DLL was executed; and selecting the DLL to be demand loaded if the DLL was not executed.

10. The computer program product, as recited in claim 9, wherein the method further includes the steps of:

determining whether the DLL contains data exports; and selecting the DLL to be demand loaded if the DLL does not contain data exports.

11. The computer program product, as recited in claim 9, wherein said method further includes the step of demand loading the DLL.

12. The computer program product, as recited in claim 9, wherein said method further includes the step of generating a shadow DLL for performing said tracing step.

13. The computer program product, as recited in claim 12, wherein said method further includes the step of generating a shadow DLL for demand loading the DLL.

14. The computer program product, as recited in claim 13, wherein said method further comprises the step of loading said shadow DLL upon reference by said application program.

15. The computer program product, as recited in claim 9, wherein said method further includes the step of loading said DLL only if said application program requires execution of said DLL.

16. The computer product, as recited in claim 9, wherein said method further includes the step of identifying a minimum set of DLLs from the application program to be demand loaded to achieve a predetermined improved execution time.

17. An information handling system comprising:
   at least one processor;
   memory operably associated with said processor;
   system bus for coupling said processor and said memory;
   a program of instructions stored in said memory;
   means for identifying a DLL referenced by said program;
   means for tracing the outputs from the DLL;
   means for examining the traced output of the DLL to determine whether the DLL was executed; and
   means for selecting the DLL to be demand loaded if the DLL was not executed.

* * * * *

UNITED STATES PATENT AND TRADEMARK OFFICE
CERTIFICATE OF CORRECTION

PATENT NO. : 6,769,126 B1  
DATED : July 27, 2004  
INVENTOR(S) : Pekowski

It is certified that error appears in the above-identified patent and that said Letters Patent is hereby corrected as shown below:

<u>Column 14,</u>
Line 37, after "DLL" delete "referenced" and insert -- reference --.
Line 53 and 56, after "includes the" delete "step" and insert -- steps --.

Signed and Sealed this

Twenty-seventh Day of September, 2005

JON W. DUDAS  
*Director of the United States Patent and Trademark Office*